United States Patent [19]

Hustig

[11] 4,247,936
[45] Jan. 27, 1981

[54] DIGITAL COMMUNICATIONS SYSTEM WITH AUTOMATIC FRAME SYNCHRONIZATION AND DETECTOR CIRCUITRY

[75] Inventor: Charles H. Hustig, Hudson, Wis.

[73] Assignee: Minnesota Mining and Manufacturing Company, St. Paul, Minn.

[21] Appl. No.: 45,860

[22] Filed: Jun. 6, 1979

[51] Int. Cl.³ .............................................. H04J 3/06
[52] U.S. Cl. ...................................... 370/100; 375/110
[58] Field of Search ................... 179/15 BS; 178/69.1; 370/100, 101, 105, 107; 375/106, 110, 118

[56] References Cited

U.S. PATENT DOCUMENTS

| 3,792,201 | 2/1974 | Osborne .......................... | 179/15 BS |
| 4,054,754 | 10/1977 | Nicodemus et al. ............ | 179/15 BS |

Primary Examiner—Douglas W. Olms
Attorney, Agent, or Firm—Cruzan Alexander; Donald M. Sell; Robert L. Marben

[57] ABSTRACT

Digital communication system of the type having a commutating N:1 multiplexer and a commutating 1:N demultiplexer. One of the N sources is inverted prior to being applied to the multiplexer. Automatic frame synchronization and detection circuitry is provided which repeatedly monitors the output of the demultiplexer at which the inverted signal is to appear when frame synchronization is present. Such output is monitored for signals of one logic during each monitoring time period to determine whether frame synchronization is present. A signal is obtained by such circuitry when frame synchronization is not present and is used to commutate the demultiplexer a predetermined number of steps whereby frame synchronization is attained.

15 Claims, 3 Drawing Figures

DIGITAL COMMUNICATIONS SYSTEM WITH AUTOMATIC FRAME SYNCHRONIZATION AND DETECTOR CIRCUITRY

BACKGROUND OF THE INVENTION

The invention presented herein relates to digital communications systems of the type having a commutating N:1 multiplexer and a commutating 1:N demultiplexer which are operatively connected wherein N sources of digital signals are multiplexed and demultiplexed, each of the N sources providing signal bits at the rate of T bits/second with only one type of logic signals presented when no information is transmitted. It, in particular, relates to the circuitry for providing automatic frame synchronization and detection of frame synchronization in such systems.

Frame synchronization required in digital communication systems of the type related to the present invention has generally been attained by the use of special digital framing codes which are inserted at the multiplexer end of the system and are detected at the multiplexer end of the system for attaining frame synchronization. Such an approach to the frame synchronization problem requires the use of complex electronic circuitry at both the multiplexer and demultiplexer.

SUMMARY OF THE INVENTION

The invention presented herein provides a digital communications system of the type indicated above in which frame synchronization is attained without the use of any digital framing codes eliminating the need for code generators and related circuitry at the multiplexer end of the system and reduces the complexity of the electronics needed at the demultiplexer end of the system to provide the necessary frame synchronization.

The digital communications system of this invention is of the type having a commutating N:1 multiplexer and a commutating 1:N demultiplexer which are operatively connected wherein N sources of digital signals are multiplexed and demultiplexed, each of the N sources providing signal bits at the rate of T bits/second with only one type of logic signals presented when no information is transmitted. This invention is also based on the fact that the N sources of digital signals are obtained from information signals that are statistically present about less than (100-P) percent of the time. For example, each of the N sources can be a T1 digital signal source of the type used in the telephone industry with a D2/D3 format which provides 1.544 megabits/secon M bs and have a frame length of 193 bits. Pulse code modulated signals of the D2/D3 formated frame provide digital signals that are based on information signals that are present about less than 50 percent of the time and present all logic "1"s, except for an "S" bit when no information is sent. The system of this invention uses an inverter at the multiplexer for receiving one source of the N sources of digital to invert it prior to multiplexing. An inverter is also then required at one output of the N outputs of the demultiplexer. By inverting one of the N sources prior to its being applied to an input of the multiplexer of the system, an opposite logic input is provided at one input of the multiplexer to provide all "0"s when no information is sent to distinguish such input from the signals provided to the remaining N-1 inputs at which all "1"s, except for an "S" bit, are provided when no information is sent.

The present invention includes frame synchronization detection circuitry that is connected to the output of the demultiplexer having the inverter which provides repetitive time or monitoring periods, plus a measure of the time when no information is presented by the digital signals at such output during each of the time periods with a signal provided whenever such measure is equal to or greater than a predetermined amount. For the digital signals sources to be used in the system of this invention, such predetermined amount would be equal to P or more percent of the monitoring period. Each signal so produced would be an indication that frame synchronization was not present. Each signal is used by additional circuitry of the present invention which is operatively connected to the demultiplexer and to the above detection circuitry. Such additional circuitry, upon receiving each signal from the detection circuitry, commutates the demultiplexer A steps, wherein A/N is a proper fraction that cannot be reduced whereby proper frame synchronization will be obtained for the system. The frame synchronization detection circuitry, plus the additional circuitry can be viewed as automatic frame synchronization circuitry.

Commutating the demultiplexer A steps in response to each signal from the frame synchronization detection circuitry can be accomplished in a number of ways, such as advancing the time a strobe signal is supplied to the strobe input of the demultiplexer, adding one or more strobe signals before the next normal strobe signal is applied or changing the time the signals from the multiplexer are presented to the demultiplexer.

One embodiment of the frame synchronization detection circuit for detecting whether frame synchronization exists in a digital communications system of the type described above includes a first counter adapted to repeatedly count K clock pulses supplied to the demultiplexer, where K is equal to or greater than F, the number of bits in a frame; a second counter adapted to respond to the digital signals from the output of the demultiplexer at which the inverted digital signals supplied to one input of the multiplexer are required to appear when there is frame synchronization for providing a signal output which indicates whether "1"s were present in the digital signals from the output of the demultiplexer for P or more percent of the time for making the count K; the first counter having an output which is operatively connected to the reset input of the second counter and at which an output signal is presented each time the count K is reached to reset the second counter; and a sampling circuit adapted for responding to the output of the first counter and the signal output of the second counter to produce a pulse signal only when the first counter reaches the count K and the second counter presents a signal output indicating that "1"s were present in the digital signals from the one output of the demultiplexer for P or more percent of the time for making the count K, which is a condition presented when frame synchronization is lacking.

The automatic frame synchronization circuitry of this invention includes the above-described frame synchronization detection circuitry plus circuit means operatively connected to the sampling circuit of the detection circuit and the demultiplexer for causing a commutation of the demultiplexer each time the sampling circuit provides an output indicating the lack of frame synchronization.

In the case where the demultiplexer of the digital communications system is located at a point, such as a central office, where a First In-First Out (FIFO) data buffer is provided at the input of the demultiplexer, an embodiment of the automatic frame synchronization circuitry of this invention can be used which includes the frame synchronization detection circuit that has been described plus circuit means operatively connected to the sampling circuit of the detection circuit and the output register of the FIFO data buffer for altering the output of the FIFO data buffer each time the sampling circuit provides an output indicating the lack of frame synchronization to effect a commutation of the demultiplexer. Such circuit means can be of a form which is effective to alter the output of the FIFO data buffer by removing a clock pulse input to the output register of the FIFO data buffer to alter the operation of the data buffer or can be of a form which adds an additional clock pulse to the output register of the FIFO to effect an alteration of the output of the FIFO data buffer.

DESCRIPTION OF THE DRAWINGS

For a more complete understanding of the invention, reference is made to the following detailed description taken in connection with the accompanying drawings in which.

DETAILED DESCRIPTION

Figure 1:
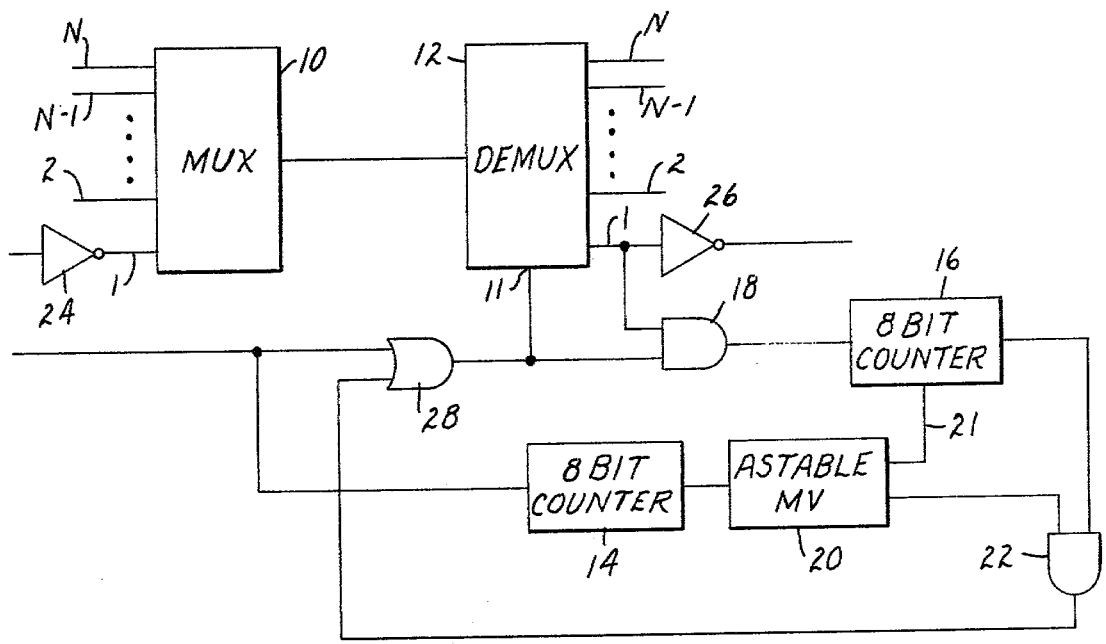
FIG. 1 is a schematic showing of one embodiment of the invention.

Referring to FIG. 1 of the drawings, a digital communications system of the present invention is shown. The system is of the type having a commutating N:1 multiplexer 10 and a connecting commutating 1:N demultiplexer 12 wherein each of the N inputs of the multiplexer receives digital signals from a different one of N sources (not shown), each having the same bit rate (T bits/second) with the digital signals presenting all "1"s (or "0"s) when no information is being sent, and each frame having F bits. The invention requires that one of the digital signal sources be connected to one of the N inputs of multiplexer 10 via an inverter. The output of the inverter presents signal bits that are opposite in logic to the logic digital signals provided by the remaining inputs when no information is contained in the digital signals supplied from the N sources. Clock pulses are supplied to a strobe input 11 of the demultiplexer 12 at a rate equal to T bits/second to effect commutation of the demultiplexer. Referring to FIG. 1, the inverter required at an input of the multiplexer is the inverter 24 which is shown connected to the input 1. Another feature with respect to the digital signal sources for reliable operation of the invention is the need for the signal sources to statistically contain information for transmission about less than (100-P) percent of the time or stated another way, contain no information P or more percent of the time.

If the signal frames are synchronized, the signals presented to the inputs 1-N of the multiplexer 10 will appear at the outputs 1-N, respectively, of the demultiplexer 12. Since the inverter 24 at the multiplexer 10 is connected to the input 1, the output 1 of the demultiplexer 12 is inverted by the inverter 26 connected to the output 1. The present invention provides for the necessary frame synchronization at the demultiplexer without the need for any framing codes, such as used in the prior art synchronizing schemes. Since the signal that is provided at the output 1 of the demultiplexer, when where is frame synchronization, is opposite in logic to the other outputs of the demultiplexer present when no information is sent, the signals at output 1 when frame synchronization is lacking can be readily distinguished from the signals at output 1 when there is frame synchronization. The signal at the output 1 is monitored continuously in accordance with the present invention to determine whether frame synchronization is present and, if it is not present, correction is made to attain frame synchronization by altering the commutations of the demultiplexer 12.

The existence of frame synchronization can be determined by repeatedly measuring the time that "1"s (or "0"s) are presented at the output 1 of the demultiplexer 12 during a measuring time period equal to or greater than the frame time of the signals supplied to the multiplexer which will provide an indication of whether no information was present in the signals at output 1 for P or more percent of a measuring time period. If the measurement of the "1"s (or "0"s) indicates no information was present for P or more percent of the measuring time period, frame synchronization is not considered present, since the statistical time when no information is sent by the signals provided to input 1 of the multiplexer 10 is less than P percent. Automatic frame synchronization is then accomplished if commutation of the demultiplexer is changed each time a measurement is made that indicates frame synchronization has not been attained. This can be done by inserting one or more pulses to the strobe input 11 of the demultiplexer in addition to those provided by the clock pulses or by preventing one or more clock pulses from being applied to the strobe input 11 of the demultiplexer 12. There is a restriction of the number of commutating steps that are changed each time, in that it must be less than N and the ratio A/N must be a proper fraction that cannot be reduced, where A is the number of commutating steps involved in each change that is made.

In order to better understand the invention, the system embodying the invention will be described for use with signal sources having definite characteristics. It is assumed that the N signal sources are T1 digital signal sources of the type used in the telephone industry with a D2/D3 format which provide 1.544 Mbs and have a frame length (F) of 193 bits. The signals present all "1"s, except for an "S" bit, when no information is sent and statistically provide no information for P or more percent of the time, where P=50. Accordingly, if frame synchronization is not present, the output 1 will be presenting signals due to any one of the N inputs, except input 1, and will, therefore, have "1"s present for 50 or more percent of the time with "0"s present the remainder of the time.

Referring to FIG. 1, which is also the case for the other figures of the drawings, one embodiment of the frame synchronization detection circuitry of this invention includes a first counter 14 operatively connected to receive and count K clock pulses from a clock pulse source (not shown) which are supplied at the bits/second rate of the signal sources for the multiplexer 10. A convenient count K is one that is greater than F, the number of bits in a frame. For T1 signal sources, the bits/second rate is 1.544 Mbs and F is 193 bits. Using an 8-bit binary counter for counter 14, a convenient count for K is 256. In this case, the output $Q_H$, the most significant bit of an 8-bit binary counter, will go low when the 256th clock pulse is received. The detection circuitry also includes a second counter 16, which is operatively connected to the output 1 of the demultiplexer for counting the "1"s that are presented during the time the first counter 14 counts to 256. Since a series of "1" bits will merely present a "1" signal level during such series, the input of the counter 16 is connected to the output of an AND gate 18 which has one input connected to the output 1 of the demultiplexer and a second input operatively connected for receiving the clock pulses that are also supplied to counter 14.

Since $Q_H$ of counter 14 goes low when a count of 256 is reached, an astable multivibrator 20 is used to respond to the $Q_H$ output and serves at the count of 256 to supply a reset signal via conductor 21 to the counter 16 and provide a logic "1" to a sampling circuit 22, which can take the form of an AND gate. The $Q_H$ output of counter 16 is also connected to the sampling circuit 22. If $Q_H$ of counter 16 also presents a logic "1", which will be the case if 128 or more "1"s were present at the output 1 of the demultiplexer during the time the counter 14 counted to 256, a logic "1" will be presented at the output of the sampling circuit 22 indicating that frame synchronization is not present. If the count were less than 128, a "0" would be presented by $Q_H$ to the sampling circuit 22 when the multivibrator 20 provides a "1" to the sampling circuit 22, the logic "0" presented at the output of the sampling circuit 22 at such time would indicate frame synchronization was present.

Reviewing the functioning of the frame synchronization detection circuit in more general terms, the first counter 14 provides a means for establishing a suitable monitoring time period for a second counter 16 in terms of a selected count of the clock pulses which are also supplied to the strobe input of the demultiplexer 12. This count is automatically repeated. Upon reaching the selected count, the counter 14 provides a signal which is used via the astable multivibrator 20 to reset a second counter 16 and supply a logic "1" to the sampling circuit 22. During the monitoring time period, the counter 12 monitors the output 1 of the demultiplexer to count the number of "1" bits that are presented. If the count present at counter 14 at the end of the monitoring time period is equal or greater than a predetermined number, which indicates the lack of frame synchronization, the counter 14 provides a logic "1" to a sampling circuit 22 which, with the logic "1" signal from the astable multivibrator 20, causes the sampling circuit 22 to provide an output signal which is terminated with the resetting of counter 16.

The frame synchronization detection circuit that has been described can be used with additional circuitry to provide the automatic frame synchronization circuitry of this invention. Such additional circuitry functions in response to each logic "1" provided by the frame synchronization detection circuit from its sampling circuit 22 to cause a change in the commutation of the demultiplexer. The absence of a logic "1" from the frame synchronization circuit when counter 14 reaches a count of 256 indicates frame synchronization has been attained.

Such additional circuitry in the case of FIG. 1 includes an OR gate 28 which has one input connected to the output of sampling circuit 22 with its other input connected for receiving the clock pulses. The output of the OR gate 28 is connected to the strobe input 11 of the demultiplexer 12 and the AND gate 18 to provide clock pulses to the counter 16 and to the demultiplexer 12 to provide clock pulses for stepping or commutating the demultiplexer. With the OR gate 28 serving as an isolation circuit, a logic "1" pulse provided at the output of the sampling circuit 22 every 256 clock pulses, when frame synchronization is lacking, is provided to the strobe input 11 of the demultiplexer to commutate the demultiplexer, since it appears as a clock pulse to the demultiplexer. A logic "1" will be provided from the sampling circuit 22 every 256 clock pulses until frame synchronization is attained to thus provide automatic synchronization without the use of any synchronization codes. Monitoring of the output 1 of the demultiplexer 12 is continuous, so the automatic synchronization circuitry provides a continuous check for frame synchronization and automatic correction of a non-synchronous condition.

Figure 2:
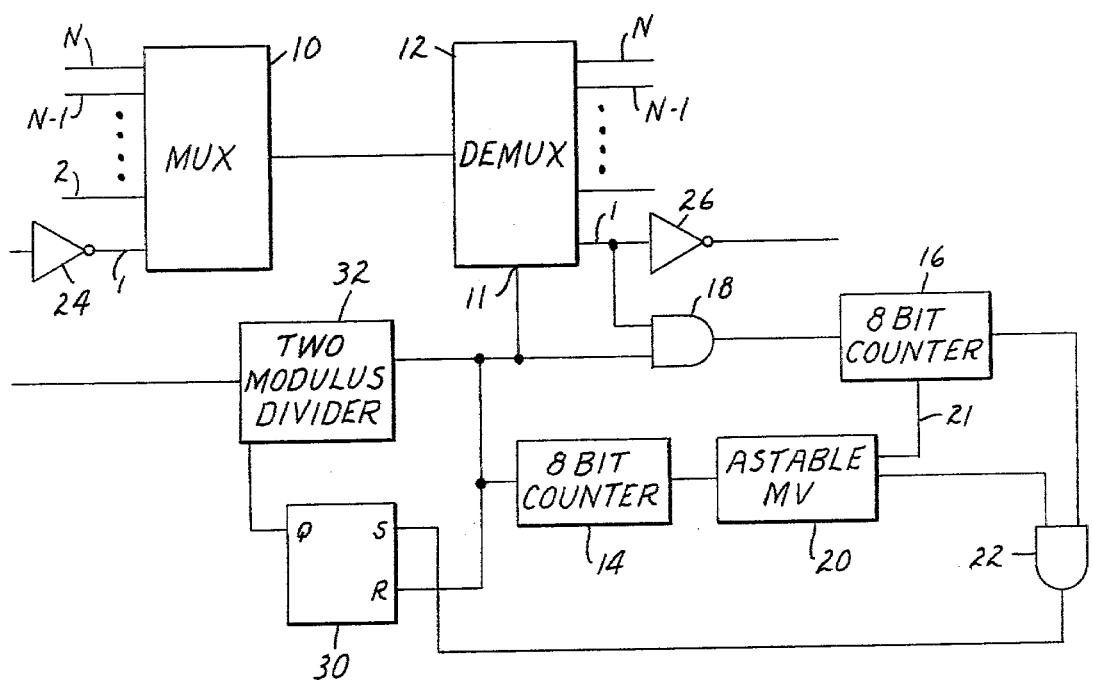
FIG. 2 is a schematic showing of another embodiment of the invention.

The additional circuitry required for use with the frame synchronization detection circuitry in FIG. 2 to provide automatic frame synchronization circuitry to alter the commutation of the demultiplexer when frame synchronization is lacking, includes circuit means for delaying the application of a clock pulse to the strobe input of the demultiplexer when the frame synchronization circuitry provides a signal indicating that frame synchronization is not present. Such circuit means includes a flip-flop 30 and a two modulus divider 32. The two modulus divider 32 receives clock pulses from a source (not shown) at the rate of N times the bit/second rate of each of the N signal sources and, in the absence of a "high" signal from the flip-flop 30, serves to divide such input by N to provide an output of clock pulses at a rate equal to the bit/second rate of each of the N signal sources. The output of divider 32 is applied to the strobe input 11 of demultiplexer 12, AND gate 18 and the first counter 14 of the frame synchronization detection circuitry and to the reset input of the flip-flop 30. The set input of the flip-flop 30 is connected to the output of the sampling circuit 22 causing the flip-flop to be set each time the frame synchronization detection circuitry detects the absence of frame synchronization which is indicated by a logic "1" pulse being provided by the sampling circuit 22. The Q output of the flip-flop 30 is connected to the two modulus divider 32 to cause the divider 32 to divide by N−A or divide by N+A when Q goes "high" where A is the number of commutating steps to be taken and A/N is a proper fraction that cannot be reduced. The Q output of the flip-flop 30 goes "high" when the flip-flop is set which, in the case of the circuitry of FIG. 2, is every time lack of frame synchronization is detected. Division of the clock input to the divider by a number greater or less than N will cause a clock pulse to be presented later than usual when the divisor is less than N and earlier than usual when the divisor is greater than N. In either case, the clock pulse produced from the divider 32 following receipt of a "high" from the Q output of flip-flop 30 will cause the demultiplexer to commutate so a different one of the N input signals to the multiplexer 10 will be presented at the output 1 of the demultiplexer 12 and will also be effective to reset the flip-flop 30 to remove the "high" at the Q output to return the divider to its normal divide-by-N operation. In this manner, automatic frame synchronization is attained.

Figure 3:
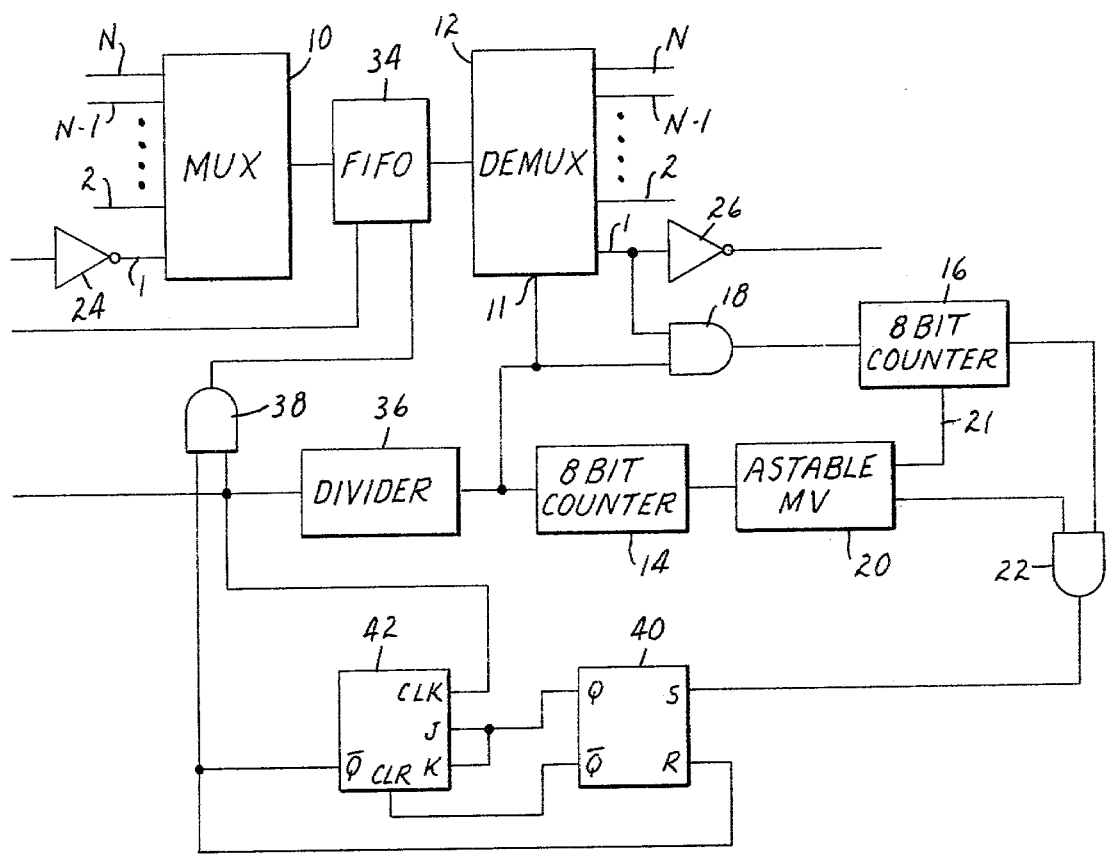
FIG. 3 is a schematic showing of a further embodiment of the invention.

There are cases presented in which a First In-First Out (FIFO) data buffer 34 is used for applying the signals from a multiplexer to the demultiplexer in a communication system of the type that has been discussed, which allows use of the automatic frame synchronizing circuitry shown in FIG. 3 for obtaining automatic frame synchronization.

The additional circuitry required for use with the frame synchronization circuitry in FIG. 3 to provide automatic frame synchronization to alter the commutation of the demultiplexer when frame synchronization is lacking includes circuit means for delaying the serial input of signals to the demultiplexer 12 from the FIFO data buffer 34 by one cycle of the clock pulses provided at a rate equal to N times the bit/second rate of the N digital signal sources supplied to the multiplexer. Such circuit means includes a divider 36 for receiving clock pulses from a source (not shown) at a rate equal to N times the bit/second rate of the N signal sources applied to the multiplexer 10 and an AND gate 38 for receiving the clock pulses supplied to the divider 36. The output of the AND gate 38 is connected to the input register of the FIFO data buffer. The divider 36 is a divide-by-N divider and operates to provide the strobe input 11 of the demultiplexer 12 with clock pulses as well as the counter 14 and AND gate 18. Two flip-flops 40 and 42 are also included which serve to control the application of signals to the other input of the AND gate 38 to block the application of clock pulses to the output register of the FIFO data buffer for a complete clock cycle for each logic "1" produced by the frame synchronization detection circuitry. This effects a delay in the application of the signals to the demultiplexer 12 to cause a commutation of the demultiplexer 12. In this manner, automatic frame synchronization can be attained.

The flip-flop 40 may be an RS flip-flop which has its set input connected to the output of the sampling circuit 22. The flip-flop 42 can be a JK type flip-flop which has its J and K inputs connected together with the clock input of the flip-flop connected to receive the clock pulses supplied to the divider 36. The Q output of flip-flop 42 is connected to the other input of AND gate 38 and to the reset input of the flip-flop 40. The $\overline{Q}$ output of flip-flop 40 is connected to the clear input of flip-flop 42. The Q output of flip-flop 40 is connected to the J and K inputs of flip-flop 42.

The operation of the automatic frame synchronization circuitry of FIG. 3 will now be described. A logic "1" provided at the output of the sampling circuit 22 when lack of frame synchronization is detected by the frame synchronization detection circuitry serves to set the flip-flop 40 causing the $\overline{Q}$ output to go low so that the flip-flop 42 is no longer receiving a clear signal. The high that is produced at the Q output of flip-flop 40 when it is set is applied to the J and K inputs of the flip-flop 42, so that the outputs of flip-flop 42 will change state on each successive negative going edge of the clock pulses received at the clock input of the flip-flop 42. The first negative going edge of a clock pulse received at the flip-flop 42 after a high has been produced at the Q output of flip-flop 40 causes the $\overline{Q}$ output of flip-flop 42 to go low blocking AND gate 38, which remains blocked until the negative going edge of the next clock pulse causes the $\overline{Q}$ output of flip-flop 42 to go high, unblocking AND gate 38 and resetting flip-flop 40. The logic "1" from sampling circuit 22 is thus effective to remove one complete clock cycle at the output register of the FIFO data buffer 34 to delay the passage of signals to the demultiplexer 12 by one clock cycle to effect a commutation of the demultiplexer. In this manner, a change in the commutation of the demultiplexer will be effected with each logic "1" provided by the frame synchronization detection circuitry until proper frame synchronization is attained.

It will be apparent to those skilled in the art that signals provided to the demultiplexer 12 could be advanced by applying an extra pulse to the output register of the FIFO data buffer in response to a logic "1" from the sampling circuit 22 by applying such pulse when the clock signals to the divider 36 present a low. The extra pulse will advance the signals to be received by the demultiplexer to effect a change in the commutation of the demultiplexer. This will be repeated with each logic "1" provided by the frame synchronization circuitry until proper frame synchronization is attained.

What is claimed is:

1. A digital communications system of the type having a commutating N:1 multiplexer and an operatively connected commutating 1:N demultiplexer wherein N sources of digital signals are multiplexed and demultiplexed, each of the N sources providing signal bits at the rate of T bits/second with only one type of logic signals presented when no information is transmitted, the system including an inverter for receiving one source of the N sources of digital signals for inverting said one source prior to multiplexing;

an inverter connected to one output of the N outputs of the demultiplexer for inverting the signals presented at said one output;

first means operatively connected to said one output for establishing repetitive time periods, providing a measure of the time the one type of logic signal is presented at said one output during each of said time periods and providing a signal whenever said measure exceeds a predetermined amount; and second means operatively connected to the demultiplexer and said first means for receiving each of said signals from said first means and in response to each of said signals from said first means commutating the demultiplexer A steps, wherein A/N is a proper fraction that cannot be reduced.

2. A digital communications system according to claim 1 wherein said first means includes first and second counters, said first counter operatively connected for repetitively providing a first predetermined count establishing said time periods, said second counter operatively connected to said one output during each count provided by said first counter for providing said measure of the time the one type of logic signal is presented at said one output of the demultiplexer during each of said time periods in terms of a count of the one type of logic signal presented at said one output of the demultiplexer, said second counter providing said signal of said first means whenever said second counter exceeds a second predetermined count.

3. A digital communications system according to claim 1 wherein the multiplexer is connected to the demultiplexer via a first in-first out data buffer and said second means is operatively connected to said first in-first out data buffer for commutating the demultiplexer by delaying the passage of signals from said data buffer to the demultiplexer in response to each of said signals provided by said first means.

4. A digital communications system according to claim 1 wherein said second means delays the commutation of the demultiplexer in response to each of said signals provided by said first means causing said commutating of the demultiplexer A steps.

5. A digital communications system according to claim 1 wherein said second means advances or delays the commutation of the demultiplexer in response to each of said signals from said first means causing said commutating of the demultiplexer A steps.

6. A digital communications system according to claim 5 wherein said second means includes a two modulus divider having its output connected to the demultiplexer for timing the commutation of the demultiplexer, said divider normally dividing by N and providing a divide by N+A or N−A operation in response to each of said signals provided by said first means, said divider operatively connected for receiving clock pulses at its input at a rate equal to NT whereby said commutating of the demultiplexer A steps is accomplished.

7. Frame synchronization detection circuitry including:
- a first means for repeatedly providing a signal at regular time intervals, each time interval representing a monitoring time period;
- a second means operatively connected to said first means and having a digital signal input for providing a measure of the time digital signals of only one type of logic is presented to said input and providing a signal when said measurement is equal to or exceeds a predetermined time which is indicative of the lack of frame synchronization; and
- a sampling circuit operatively connected to said first and second means for receiving each of said signals provided by said first and second means and providing a signal when said signals provided by said first and second means are present at the same time.

8. Frame synchronization detection circuitry according to claim 7 wherein said sampling circuit is an AND gate.

9. Frame synchronization detection circuitry in accordance with claim 7 wherein said first means includes a first counter operatively connected for repetitively providing a first predetermined count for providing said monitoring time periods and said second means includes a second counter operatively connected during each count provided by said first counter for providing said measure of the time only one type of logic is presented to said input of said second means in terms of a count, said second counter providing said signal from said second means when the count of said second counter exceeds a second predetermined count.

10. Frame synchronization detection circuitry according to claim 9 wherein said first means includes an astable multivibrator operatively connected to said first counter for providing said signal of said first means in response to said first counter reaching said first predetermined count and operatively connected to said second counter for resetting said second counter when said first counter reaches said first predetermined count.

11. Frame synchronization detection circuitry according to claim 9 wherein said first counter includes a clock input for receiving clock pulses and said second means includes an AND gate for providing said digital signal input and another input for receiving the same clock pulses as said first counter.

12. Automatic frame synchronization circuitry including
- a first means having a digital signal input and operatively connected for establishing repetitive time periods, providing a measure of the time only one type of logic signal is presented to said input during each of said time periods and providing a signal whenever said measure exceeds a predetermined amount; and
- a second means operatively connected to said first means and in response to each of said signals from said first means providing a signal usable as a demultiplexer strobe signal.

13. Automatic frame synchronization circuitry according to claim 12 wherein said first means includes first and second counters, said first counter operatively connected for repetitively providing a first predetermined count establishing said time periods, said second counter operatively connected during each count provided by said first counter for providing said measure of the time only one type of logic is presented at said input, said second counter providing said signal of said first means whenever said second counter exceeds a second predetermined count.

14. Automatic frame synchronization circuitry including
- a first means having a digital signal input and operatively connected for establishing repetitive time periods, providing a measure of the time only one type of logic signal is presented to said input during each of said time periods and providing a signal whenever said measure exceeds a predetermined amount; and
- a second means including a divider operatively connected for operation in accordance with the presence or absence of said signals from said first means for providing demultiplexer strobe signals at one rate when said signals from said first means are not present and at a lesser or greater rate for one operation of said divider at such lesser or greater rate each time one of said signals from said first means is present.

15. Automatic frame synchronization circuitry including
- a first means having a digital signal input plus first and second counters, said first counter operatively connected for repetitively providing a first predetermined count at a selected rate and providing a signal for each first predetermined count made, said second counter operatively connected to said digital signal input and said second counter for providing a count of the number of only one type of logic signals when presented to said digital signal input and providing a signal whenever the count of said second counter exceeds a second predetermined count;
- a sampling circuit operatively connected to said first means for responding to said signals provided by said first and second counters and providing a signal when said signals provided by said first and second counters are present at the same time; and
- a second means including an AND gate having one input for connection to a source of clock pulses provided at a rate that is greater than the rate at which said first counter counts, said second means providing a logic high to said second input, except for one clock period of said clock pulses each time said signal from said sampling circuit means is provided to said second means.

* * * * *

UNITED STATES PATENT AND TRADEMARK OFFICE
CERTIFICATE OF CORRECTION

PATENT NO. : 4,247,936
DATED : January 27, 1981
INVENTOR(S) : Charles H. Hustig

It is certified that error appears in the above-identified patent and that said Letters Patent are hereby corrected as shown below:

Column 1, line 51, change "megabits/secon" to --megabits/second--.

Column 4, line 4, change "where" to --there--.

Column 5, line 26, after "0" add --logic--.

Column 5, line 43, change "12" to --16--.

Signed and Sealed this

Twenty-first Day of April 1981

[SEAL]

Attest:

RENE D. TEGTMEYER

Attesting Officer

Acting Commissioner of Patents and Trademarks